(12) United States Patent
Ng

(10) Patent No.: US 7,784,005 B1
(45) Date of Patent: Aug. 24, 2010

(54) ELECTRONIC CIRCUIT DESIGN VIEWER

(75) Inventor: Roger Ng, San Francisco, CA (US)

(73) Assignee: Xilinx, Inc., San Jose, CA (US)

( * ) Notice: Subject to any disclaimer, the term of this patent is extended or adjusted under 35 U.S.C. 154(b) by 300 days.

(21) Appl. No.: 11/151,984

(22) Filed: Jun. 14, 2005

(51) Int. Cl.
*G06F 17/50* (2006.01)

(52) U.S. Cl. .................................. 716/11; 716/1; 716/16

(58) Field of Classification Search ................... 716/11, 716/16, 1, 2
See application file for complete search history.

(56) References Cited

U.S. PATENT DOCUMENTS

| | | | | |
|---|---|---|---|---|
| 5,946,219 A * | 8/1999 | Mason et al. | ................. | 716/16 |
| 6,152,612 A * | 11/2000 | Liao et al. | ..................... | 703/23 |
| 6,215,327 B1 * | 4/2001 | Lyke | ............................ | 326/41 |
| 6,272,671 B1 * | 8/2001 | Fakhry | ........................ | 716/18 |
| 6,289,489 B1 * | 9/2001 | Bold et al. | ...................... | 716/1 |
| 6,366,874 B1 * | 4/2002 | Lee et al. | ...................... | 703/14 |
| 6,470,482 B1 * | 10/2002 | Rostoker et al. | ............... | 716/6 |
| 6,643,836 B2 * | 11/2003 | Wheeler et al. | ............... | 716/11 |
| 6,763,506 B1 * | 7/2004 | Betz et al. | ...................... | 716/6 |
| 6,879,184 B1 * | 4/2005 | Fisk | ............................. | 326/41 |
| 7,120,883 B1 * | 10/2006 | van Antwerpen et al. | ....... | 716/6 |
| 7,131,086 B2 * | 10/2006 | Yamasaki et al. | .............. | 716/5 |
| 7,418,690 B1 * | 8/2008 | Van Antwerpen | ............ | 716/16 |
| 2004/0133869 A1 * | 7/2004 | Sharma | ........................ | 716/16 |
| 2005/0156626 A1 * | 7/2005 | Tomar et al. | .................. | 326/38 |
| 2005/0268269 A1 * | 12/2005 | Coiley | ........................ | 716/11 |

* cited by examiner

*Primary Examiner*—Jack Chiang
*Assistant Examiner*—Patrick Sandoval
(74) *Attorney, Agent, or Firm*—LeRoy D. Maunu

(57) ABSTRACT

Various approaches for displaying design data that implements an electronic design in lookup tables (LUTs) of a programmable logic device are disclosed. In one approach, a user is presented for selection at least two selectable modes for displaying a function performed by a LUT that is configurable with the design data to implement a function of the electronic design. The modes have associated, different formats for display of a function. In response to selection of an object that represents a first LUT having an assigned initialization value and in response to selection of one of the modes, the function performed by the first LUT, as defined by the initialization value, is displayed in the format associated with the selected mode.

16 Claims, 5 Drawing Sheets

US 7,784,005 B1

ELECTRONIC CIRCUIT DESIGN VIEWER

FIELD OF THE INVENTION

The present invention generally relates to electronic design tools.

BACKGROUND

Various software tools are used to support developing and implementing an electronic circuit design. A design entry tool allows a user to specify the functional characteristics of an electronic circuit. Example design entry tools include high-level modeling systems, hardware description languages, and schematic capture. Once the design is specified, a synthesis tool may be applied to the high-level design to generate a netlist. And from the netlist, the design may be simulated or mapped to a particular device or chip technology.

Some designs are targeted for implementation on field programmable gate arrays (FPGAs). FPGAs include lookup tables that are programmable to implement various logic functions. After device mapping, the design data includes initialization values for the LUTs used to implement the design.

The initialization values of LUTs may be useful for debugging designs. For example, when analyzing and adjusting a design for conformance to maximum delay parameters, it may be useful to combine, if feasible, the logic implemented on two LUTs into a single LUT since each LUT has a constant delay. The initialization value of the LUT may indicate whether the capabilities of the LUT are being fully used. If a LUT's capabilities are only partially used, the functions of two or more LUTs may be combined into a single LUT to reduce the maximum delay.

In order to determine whether a LUT is candidate for combining logic functions, the initialization value of the LUT may be examined to determine the extent to which the capabilities of the LUT are utilized. A user may view the initialization value for LUT with certain design tools. However, these tools often output this configuration value in hexadecimal form. The user may thereby be forced to decode the hexadecimal value to determine whether the LUT may be combined with another LUT.

The present invention may address one or more of the above issues.

SUMMARY OF THE INVENTION

The invention provides various embodiments for displaying design data that implements an electronic design in lookup tables (LUTs) of a programmable logic device are disclosed. In one embodiment, a user is presented for selection at least two selectable modes for displaying a function performed by a LUT that is configurable with the design data to implement a function of the electronic design. The modes have associated, different formats for display of a function. In response to selection of an object that represents a first LUT having an assigned initialization value and in response to selection of one of the modes, the function performed by the first LUT, as defined by the initialization value, is displayed in the format associated with the selected mode.

In another embodiment a graphical user interface (GUI) is provided for displaying design data that implements an electronic design in lookup tables (LUTs) of a programmable logic device. The GUI includes a plurality of icons representing look-up tables (LUTs) and connections between the LUTs. The LUTs are configurable with respective initialization values to implement functions of the electronic design, and the icons are responsive to user selection. At least two graphical objects are responsive to user selection, with the graphical objects being associated with different formats for displaying a function performed by a configured LUT. In response to selection of one of the plurality of icons and selection of one of the graphical objects, an object is displayed that shows the function performed by the LUT represented by the selected icon as defined by the initialization value and in the format associated with the selected object.

In yet another embodiment, an article of manufacture is provided. The article of manufacture includes a processor-readable medium configured with instructions executable by a processor to display design data that implements an electronic design in lookup tables (LUTs) of a programmable logic device. In response to execution of the instructions, the processor performs the steps including, presenting for user selection at least two selectable modes for displaying a function performed by a LUT that is configurable with the design data to implement a function of the electronic design. The modes have associated, different formats for display of a function. The steps also include displaying, in response to selection of an object that represents a first LUT having an assigned initialization value and in response to selection of one of the modes, the function performed by the first LUT as defined by the initialization value and in the format associated with the selected mode.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention may be used to view design data that is mapped to resources of a target hardware device. For example, in one approach the user is provided with a graphical user interface (GUI) for viewing the functions of lookup tables (LUTs) of a programmable logic device. The GUI presents to the user a number of options for viewing the function of a LUT in different formats. In response to a selection of a particular LUT and a selection of a format for viewing the function of the LUT, the function is displayed in the selected format. The GUI-provided capability to view the LUT functions in different formats alleviates the user having to convert a coded initialization value for a LUT into forms suitable for analysis.

Figure 1:
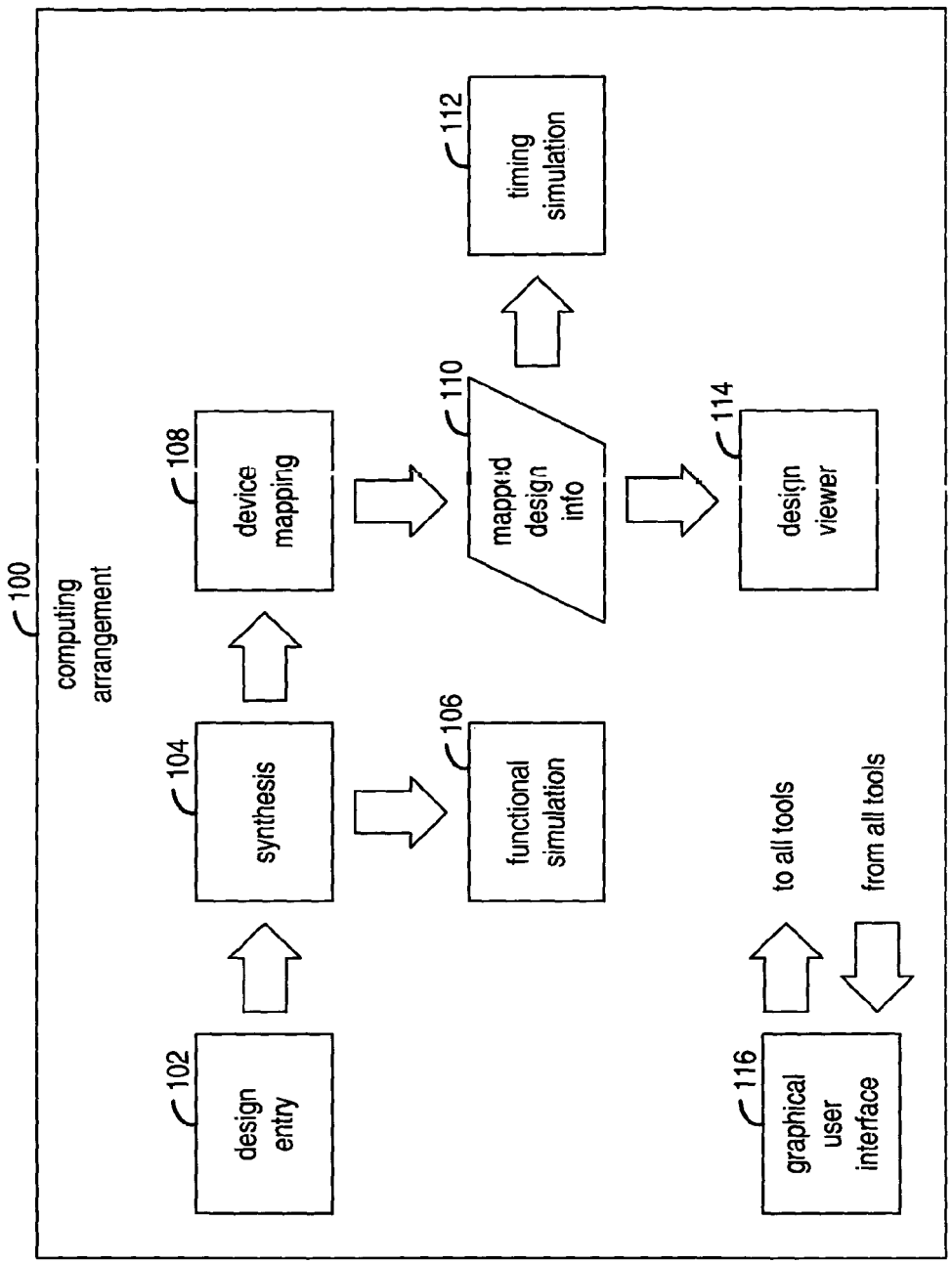
FIG. 1 is a functional block diagram that shows a computing arrangement for preparing and viewing an electronic circuit design in accordance with various embodiments of the invention.

FIG. 1 is a functional block diagram that shows a computing arrangement 100 for preparing and viewing an electronic circuit design in accordance with various embodiments of the invention. The tools hosted by the computing arrangement generally include tools for design entry, logic synthesis, simulation, device mapping, and viewing mapped design information. Those skilled in the art will recognize various suitable specific instances of these tools.

Design entry tool 102 may be used to prepare a design of an electronic circuit. Example design entry tools include tools for processing hardware description languages (HDLs), schematic capture tools, and high-level modeling systems. The design information from the design entry tool is input to synthesis tool 104, which generates a netlist. The netlist may be used for functional simulation 106 of the design. If errors are discovered from functional simulation, the design may be modified with the design entry tool and netlisted once again.

Once a satisfactory functional simulation is achieved, the netlisted design may be mapped to a particular hardware device with device mapping tool 108. Device mapping tool 108 is generally specific to the particular targeted hardware technology. For example, in one embodiment, the device mapping tool generates initialization data for the configurable resources of a programmable logic device such as an FPGA. The initialization data for an FPGA includes values for lookup tables (LUTs) used to implement the design, along with data that specify configuration of input/output resources and routing between the LUTs. The mapped design information 110 models the initialization data in a manner that allows a user to perform timing simulation as shown by block 112. Based on the results of the timing simulation, the synthesized design may be adjusted to satisfy the desired timing constraints.

In one embodiment, design viewer 114 allows the user to view the mapped design information 110 as objects of the target hardware device used to implement the design. For example, the LUTs of an FPGA that are used to implement the design are displayed as interconnected blocks along with the initialization values of the LUTs. This information may be useful to satisfy timing constraints by combining functions implemented on multiple LUTs into a function implemented on a single LUT.

Graphical user interface (GUI) 116 provides a user with capabilities for data input and output to the various design tools. It will be appreciated that the collection of hardware and software comprising the GUI depend on the specific tools and architecture of the computing arrangement that hosts the tools. For example, the computing arrangement may be a stand-alone workstation or a collection of networked workstations coupled to a server. The GUI may include software executing on one or multiple workstations along with one or more display monitors, keyboards, and point-and-click devices.

In one embodiment, the design viewer 114, in combination with the GUI 116, allows the user to select graphical objects that represent the LUTs used to implement the design for purposes of viewing the functions implemented on the LUTs. The format in which the implemented function is displayed is also selectable by the user. For example, the design viewer, by way of the GUI, allows the user to select and view a LUT's function as a schematic view, a truth table, or a Karnaugh map. This alleviates the user having to convert a hexadecimal initialization value for the LUT into a form more easily understood for analysis.

Figure 2:
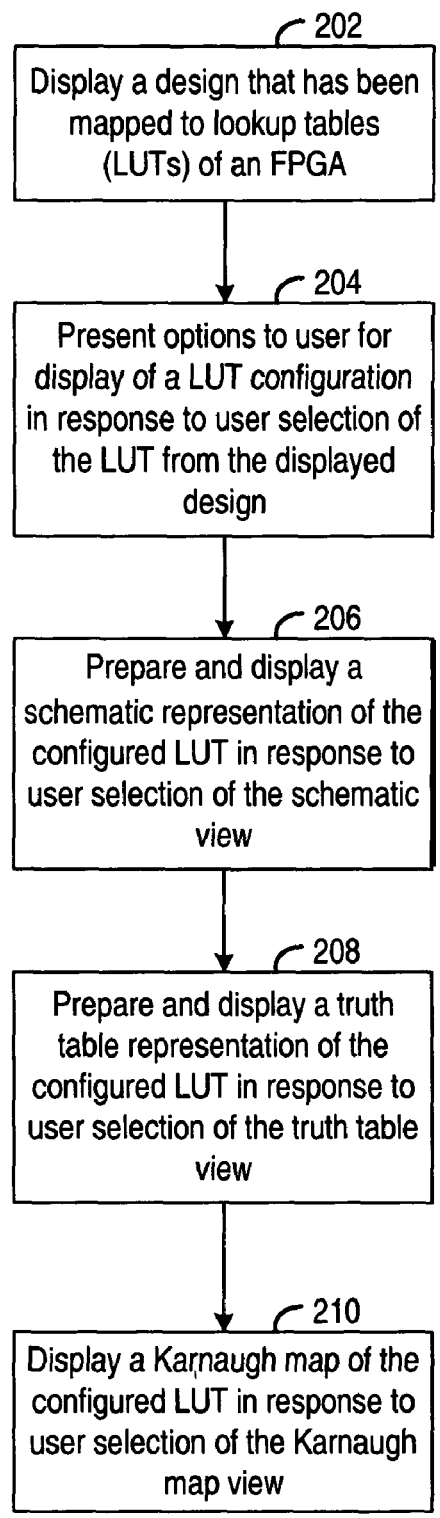
FIG. 2 is a flowchart of an example process for viewing information that describes an electronic circuit design in accordance with various embodiments of the invention.

FIG. 2 is a flowchart of an example process for viewing information that describes an electronic circuit design in accordance with various embodiments of the invention. The process may be implemented by a design viewer 114, for example. As described in FIG. 1, the input to the design viewer is the mapped design information 110 for a particular type of hardware device, for example, an FPGA.

Figure 3:
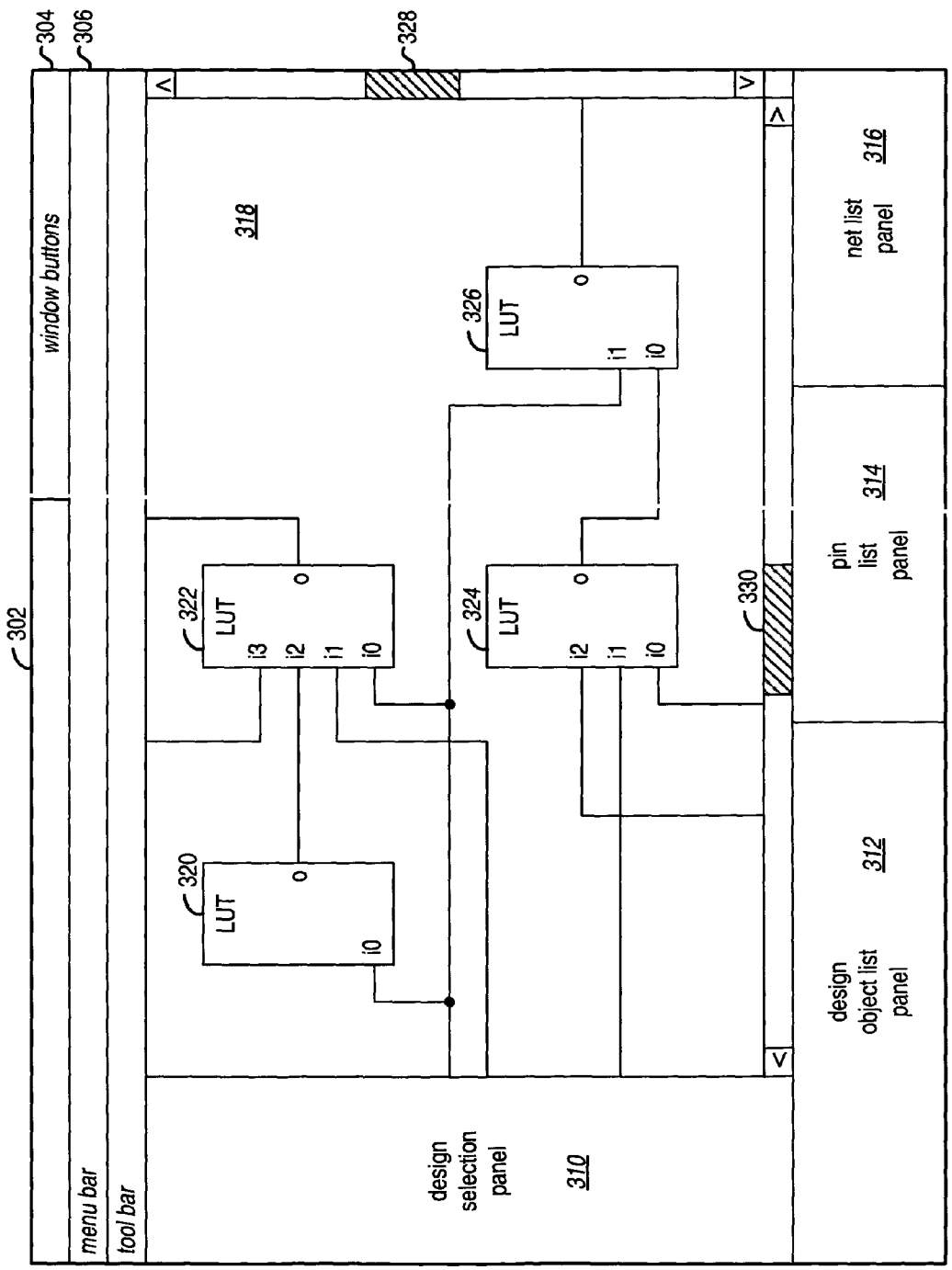
FIG. 3 shows an example window in which mapped design information of an example circuit is displayed by way of a graphical user interface.

The mapped design information is displayed by the design viewer 114 in response to user selection of the design. FIG. 3 shows an example window 302 in which mapped design information of an example circuit is displayed by way of GUI 116.

Along with the conventional window buttons 304, menu bar 306, and tool bar 308, the window 302 includes a number of panels from which the user may select various design objects for display. The example panels include design selection panel 310, design object list panel 312, pin list panel 314, and net list panel 316. The design selection panel lists by name electronic circuit designs that are available for viewing.

The design object list panel allows the user to select instances of objects in the design for viewing. The design object list panel lists all instances in graphical view panel 318. A user can select a object in design object list panel and the selected object is highlighted in the graphical view panel.

The pin list panel 314 lists the names of input and output pins of the design that are shown in graphical view panel 318. A user can select a pin in pin list panel and the selected pin is highlighted in the graphical view panel.

The net list panel 316 lists by name the nets in the design that are shown in graphical view panel 318. A user can select a net in net list panel and the selected net is highlighted in the graphical view panel.

Window 302 also includes a graphical view panel 318 in which graphical objects are displayed in response to/user selection of an object from the design object panel 312. A portion of an example design is shown in panel 318. The displayed portion of the design is shown as being implemented with LUTs displayed as blocks 320, 322, 324, and 326. Connection lines connect LUTs used to implement the design, and scroll bars 328 and 330 may be used to view other parts of the implemented design. For ease of explanation, the blocks that represent LUTs will be referred to as LUTs.

In an example embodiment, the user can see in the graphical view panel how the design has been mapped to an FPGA. The user may select a LUT, for example, by double clicking on the graphical object, to open a LUT dialog box which shows the function implemented by the LUT.

Figure 4:
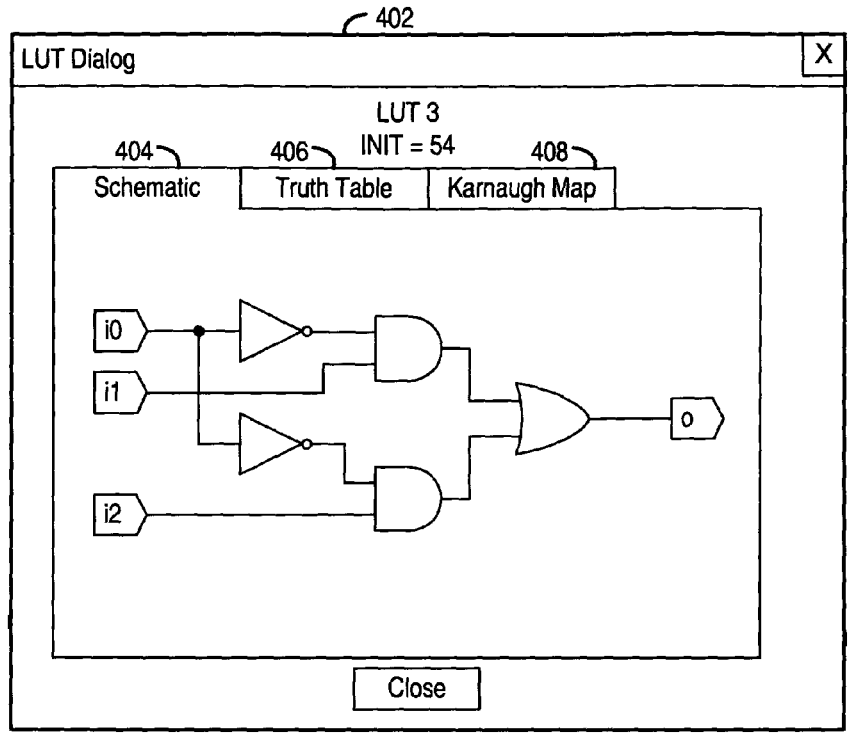
FIG. 4 shows an example dialog box in which a schematic view of a an example function implemented on a lookup table is displayed.
Figure 5:
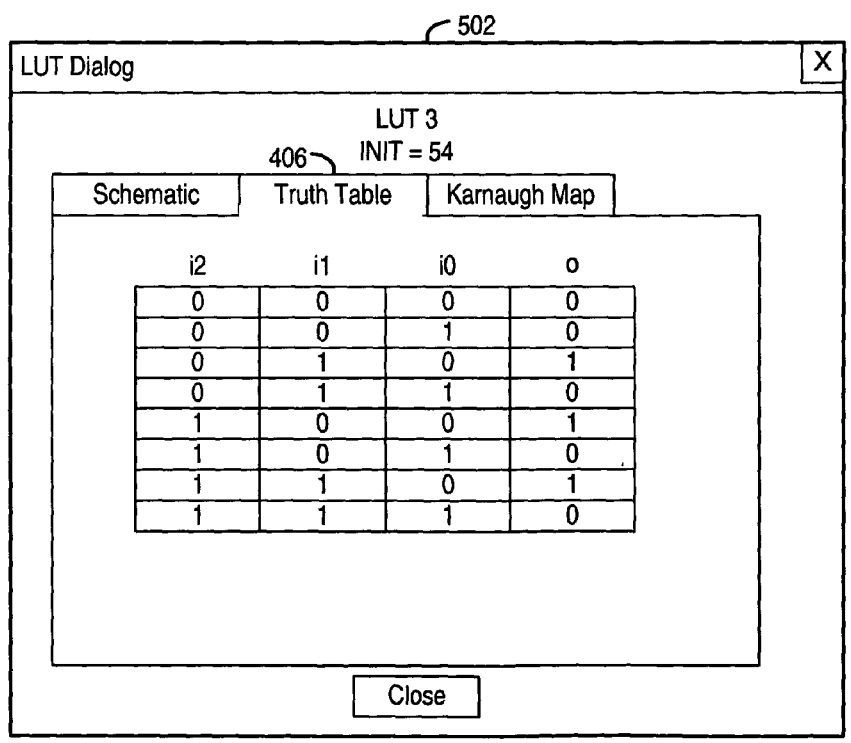
FIG. 5 shows an example dialog box in which a truth table of the example function is displayed.
Figure 6:
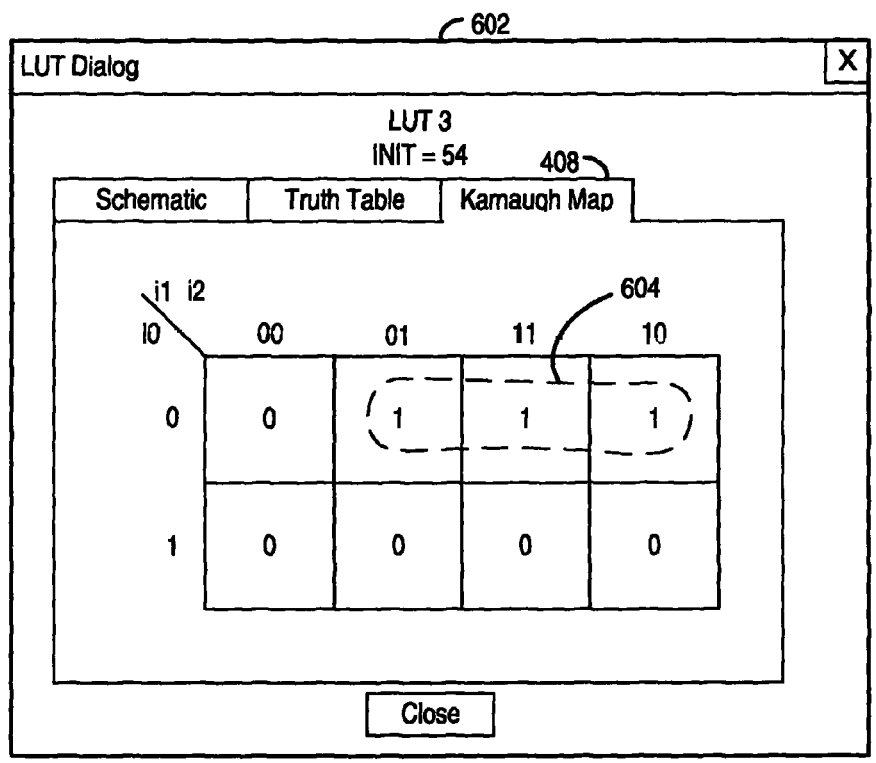
FIG. 6 shows an example dialog box in which a Karnaugh map of the example function is displayed.

Returning now to FIG. 2, in response to user selection of a LUT in the graphical view panel, the user is presented with options for viewing the function implemented by the selected LUT (step 204). The options include, for example, a schematic view, a truth table, and a Karnaugh map. FIGS. 4, 5, and 6 show these different formats for viewing the function of LUT 324. In one embodiment, the selection of a LUT opens a dialog box in which the function is displayed in one of the formats as a default format. In response to user selection of the option for displaying a schematic view, the design viewer displays the function performed by the selected LUT in schematic format (step 206).

FIG. 4 shows an example dialog box 402 in which a schematic view of a function is displayed. The example LUT is a three-input LUT with the initialization value equal to hexadecimal 54 (the "INIT" value). The different formats for displaying the function may be selected by point-and-clicking on tabs 404, 406, and 408. Those skilled in the art will recognize that other GUI mechanisms, such as icons, buttons, or menus, may be used for selecting the different formats.

The graphical symbols labeled, i0, i1, and i2, correspond to the three input ports of the selected LUT 324 in FIG. 3. The symbol labeled, o, corresponds to the output port of LUT.

The schematic may be generated by forming a Boolean expression of the output as a function of the inputs and reducing the Boolean expression it to a minimal term using standard reduction methods. The Boolean expression may be determined from the initialization value (hex 54) of the LUT, where the initialization value indicates the logic output values of the LUT in response to combinations of logic values at the input ports of the LUT. The truth table shown in FIG. 5 illustrates the relationship of the initialization value to the inputs of the LUT. The minimal term equation derived from the Boolean expression may then be used to select and connect the logic symbols for display.

Returning now to FIG. 2, in response to user selection of the option for displaying a truth table, the design viewer displays the function of the LUT in truth table format (step 208). FIG. 5 shows an example dialog box 502 in which a truth table of an example function implemented on a LUT is displayed. The truth table of FIG. 5 corresponds to the same function and LUT as displayed in the schematic view of FIG. 4.

The columns labeled, i2, i1, and i0 correspond to the input ports of the LUT, and the column labeled, o, corresponds to the output port. The different possible combinations of input logic values and the resulting output values form the rows of the table.

In constructing the truth table, each of the hex digits becomes 4 of the logic values in the output column. The top output logic value in the table is the least significant bit of the initialization value, and the bottom output logic value in the table is the most significant bit of the initialization value (hexadecimal value 54 equals binary value 01010100 and least significant to most significant digits reading from right to left).

Returning now to FIG. 2, at step 210 the design viewer displays the function of the selected LUT in Karnaugh map format in response to user selection of that format option. FIG. 6 shows an example dialog box 602 in which a Karnaugh map of the example function is displayed. The Karnaugh map is a simplified version of the truth table as recognized by those skilled in the art. The possible combinations of logic values of the i1 and i2 inputs are the column headings, and the possible logic values of the i0 input are the row headings. The logic bits of the initialization value are the entries in the map. The function may be minimized by noting that when the output is logic 1 the input i0 is always logic 1 (set of bits 604).

Those skilled in the art will recognize that the functions implemented by LUTs of sizes other than 3 may be displayed with larger truth tables and Karnaugh maps.

Various alternative computing arrangements, including one or more processors and a memory arrangement configured with program code, would be suitable for hosting the tools and processes of the different embodiments of the present invention as recognized by those skilled in the art. In addition, the processes may be provided via a variety of computer-readable media or delivery channels such as magnetic or optical disks or tapes, electronic storage devices, or as application services over a network.

The present invention is thought to be applicable to a variety of systems for creating and debugging electronic circuit designs. Various embodiments of the present invention are described in terms of configuration data for lookup tables of a field programmable gate array (FPGA). Those skilled in the art will appreciate, however, that the invention may be applied to other devices having comparable design data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for displaying design data that implements an electronic design in lookup tables (LUTs) of programmable logic, comprising:

providing mapped design data that implements the electronic design with respectively assigned initialization values that define respective functions for the LUTs;

presenting for user selection at least two selectable modes for displaying the function performed by a LUT, wherein the modes have associated, different formats for display of the function; and displaying, in response to selection of an object that represents a first LUT having one of the respectively assigned initialization values and in response to selection of one of the modes, the function performed by the first LUT as defined by the one initialization value and in the format associated with the selected mode;

wherein a first format associated with a first mode is a Karnaugh map format, and each column heading and each row heading of the Karnaugh map format is labeled with a combination of one or more input values to the LUT; and wherein the providing, presenting, and displaying are performed on a computer programmed to perform the providing, presenting, and displaying.

2. The method of claim 1, wherein the modes include second and third modes having associated schematic view and truth table formats, respectively; and wherein a column in the truth table format lists respective output values associated with all possible combinations of input values to the LUT.

3. The method of claim 1, wherein a second format associated with a second mode is a schematic view format.

4. The method of claim 1, wherein a second format associated with a second mode is a truth-table format; and wherein a column in the truth table format lists respective output values associated with all possible combinations of input values to the LUT.

5. The method of claim 1, further comprising displaying a plurality of objects that represent LUTs and connections between the LUTS, the LUTs being configurable with the design data to implement functions of the electronic design.

6. The method of claim 5, wherein the modes include second and third modes having associated schematic view and truth table formats, respectively; and wherein a column in the truth table format lists respective output values associated with all possible combinations of input values to the LUT.

7. The method of claim 5, wherein a second format associated with a second mode is a schematic view format.

8. The method of claim 5, wherein a second format associated with a second mode is a truth-table format.

9. A graphical user interface for displaying design data that implements an electronic design in lookup tables (LUTs) of programmable logic, comprising:

a computer including a processor coupled to a display;

a plurality of icons representing look-up tables (LUTs) and connections between the LUTs presented on the display, the icons being responsive to user selection;

wherein the plurality of icons and connections represent mapped design data that implements the electronic design with respectively assigned initialization values that define respective functions for the LUTs;

at least two graphical objects presented on the display and responsive to user selection, the graphical objects associated with different formats for displaying the function performed by a LUT with one of the respectively assigned initialization values; and an object presented on the display in response to selection of one of the plurality of icons and selection of one of the graphical objects, wherein the object shows the function performed by the LUT represented by the selected icon as defined by the respectively assigned initialization value and in the format associated with the selected object;

wherein the formats include a Karnaugh map format, and each column heading and each row heading of the Karnaugh map format is labeled with a combination of one or more input values to the LUT; and wherein the processor presents the icons, graphical objects, and object on the display.

10. The graphical user interface of claim 9, wherein the formats include a schematic view and truth table.

11. The graphical user interface of claim 9, wherein the formats include a schematic view.

12. The graphical user interface of claim 9, wherein the formats include a truth-table.

13. An article of manufacture, comprising:

a processor-readable storage medium configured with instructions executable by a processor to display design data that implements an electronic design in lookup tables (LUTs) of programmable logic by performing the steps including, providing mapped design data that implements the electronic design with respectively assigned initialization values that define respective functions for the LUTs;

presenting for user selection at least two selectable modes for displaying the function performed by a LUT, wherein the modes have associated, different formats for display of the function; and displaying, in response to selection of an object that represents a first LUT having one of the respectively assigned initialization values and in response to selection of one of the modes, the function performed by the first LUT as defined by the one initialization value and in the format associated with the selected mode;

wherein a first format associated with a first mode is a Karnaugh map format, and each column heading and each row heading of the Karnaugh map format is labeled with a combination of one or more input values to the LUT.

14. The article of manufacture of claim 13, wherein the modes include second and third modes having associated schematic view and truth table formats, respectively.

15. The article of manufacture of claim 13, wherein the processor-readable medium is further configured with instructions executable by the processor to perform the step of displaying a plurality of objects that represent LUTs and connections between the LUTS, the LUTs being configurable with the design data to implement functions of the electronic design.

16. The article of manufacture of claim 15, wherein the modes include second and third modes having associated schematic view and truth table formats, respectively.

* * * * *